United States Patent [19]

Childress

[11] Patent Number: 4,646,250

[45] Date of Patent: Feb. 24, 1987

[54] DATA ENTRY SCREEN

[75] Inventor: John F. Childress, Lewisville, Tex.

[73] Assignee: International Business Machines Corp., Armonk, N.Y.

[21] Appl. No.: 662,163

[22] Filed: Oct. 18, 1984

[51] Int. Cl.⁴ .............................................. G06F 3/14
[52] U.S. Cl. .................... 364/518; 340/734; 364/521
[58] Field of Search ........ 364/518, 521, 200 MS File, 364/900 MS File; 340/709, 715, 734, 739

[56] References Cited

U.S. PATENT DOCUMENTS

| | | | |
|---|---|---|---|
| 3,505,665 | 4/1970 | Lasoff et al. | 340/739 X |
| 3,566,361 | 2/1971 | Lavertu et al. | 340/734 X |
| 3,872,462 | 3/1975 | Lemelson | 340/734 X |
| 4,435,778 | 3/1984 | Cason et al. | 340/709 X |
| 4,460,960 | 7/1984 | Anderson et al. | 364/900 X |
| 4,484,304 | 11/1984 | Anderson et al. | 364/900 |
| 4,536,848 | 8/1985 | d'Entremont et al. | 364/521 X |

Primary Examiner—Parshotam S. Lall
Assistant Examiner—H. R. Herndon
Attorney, Agent, or Firm—C. Lamont Whitham; Thomas F. Galvin

[57] ABSTRACT

A data entry screen for an interactive data entry system provides a means for identifying to a user those fields where data may be entered and those fields in which data must be entered. Initially, the formatted data entry screen is displayed to the user with mandatory data entry fields highlighted and optional data entry fields without highlighting. As data is correctly entered into either a mandatory or optional data entry field, the data is processed and redisplayed without highlighting. The interactive data entry system checks the correctness of data entered by the user in the mandatory and some of the optional data entry fields, and if an error is detected, the incorrectly entered data is redisplayed with highlighting whether the data was entered in a mandatory or an optional data entry field.

5 Claims, 2 Drawing Figures

SHIPMENT TRACING

Enter Pro numbers and type "X" in the columns HISTORY and COPY if the Pro number history and copy bill are required.

PRO NUMBER    HISTORY    COPY

FIG. 1

DATA ENTRY SCREEN

BACKGROUND OF THE INVENTION

This invention generally relates to computer/user interfaces and, more particularly, to a data entry screen which provides a means for identifying to a user those fields where data may be entered and those fields in which data must be entered.

In business applications of computers and data processing systems, one of the most common tasks of a user is that of entering data into fields on a display screen. This is typically done by positioning a cursor at the beginning of a data entry field and entering the data via a keyboard. The display screen simulates a preprinted form, such as for example an order form or shipping invoice, and as in a preprinted form, each data entry field is defined by underscores or some other delineation.

The code for the display screen allows the cursor to be moved anywhere within the display area, but entries are accepted only for defined data entry fields. Alternatively, in some systems, the code for the display screen prevents the cursor from being moved anywhere within the display area except for data entry fields. In either case, the procedure usually followed is for the cursor to automatically go to the beginning of the first data entry field, then when the user enters the data for that field by typing in the data, the cursor automatically goes to the beginning of the next data entry field, and so forth. If no data is to be entered in a given field, the user merely presses the TAB or RETURN key to cause the cursor to move to the next field. Upon completion of all of the data entries, the user presses the ENTER key. In systems where the ENTER and TAB or RETURN functions are provided by the same key, pressing that key causes the cursor to move to the next data entry field.

It is of course not necessary to display the document that will be printed on the data entry screen. Instead, the data entry fields might be displayed in tabular form adjacent prompts indicating the type of data that should be input for each field. These prompts might be, for example, the date, a purchaser's name and company, the addresses of the purchaser and place of shipment, the goods purchased, and identifying stock numbers and prices and so forth. This data is then merged with the text of the order form and/or shipping invoice in the printing operation.

In the past, data entry systems of this type have generally been passive rather than interactive with the user. Either the user was allowed to skip past data entry fields by pressing the key which served to enter data or, where data entry was madatory in a particular field, the cursor would not move until data was entered in the field and then the key pressed. More recently, interactive data entry systems have been developed wherein some aspect of the entered data is checked to provide an indication of whether the data entered is correct or not. For example, if the postal zip code does not correspond to the city and state of an entered address or if the stock number or price does not correspond to the description of goods, the data entry system displays and error message. The user must then check the data entered and then enter the correct data. In other systems, provision has been made to distinguish those fields where data entry is optional.

Thus, the trend in interactive data entry systems is to both simplify and minimize errors in the data entry process.

SUMMARY OF THE INVENTION

It is therefore an object of the present invention to provide an improved data entry screen for an interactive data entry system.

It is another object of this invention to provide a data entry screen and related processing which clearly identifies for the user those fields in which data must be entered.

It is a further object of the invention to provide an interactive data entry screen wherein erroneous information entered by a user is redisplayed in a manner consistent with the initial display so that the user can readily identify the data that must be corrected.

According to a preferred embodiment of the present invention, each data entry field is identified by an arrow (=→) or some other indicator horizontally aligned with and to the left of the field. The exact placement and length of each field is defined by underscores and imbedded constants until data is entered in the field. When the formatted screen is initially displayed to the user for his or her entries, arrows pointing to mandatory entry fields are highlighted, as are the underscores. Highlighting on a monochrome display is by increased intensity or reverse video. On a color display, highlighting could be by different background or foreground colors. Other types of highlighting including blinking displays can also be used. Assuming for the moment a monochrome display, optional data entry fields are displayed with normal intensity. When the user makes an entry, whether it be for a mandatory or optional data entry field, those fields in which correct information has been entered are processed and redisplayed with normal intensity. Erroneous information, whether entered in a mandatory or optional data entry field, is redisplayed in highlight. This use of highlighting is consistent with the initial display since highlighting always identifies fields in which the user must make an entry before the total set of entered data can be processed. Depending on the specific application, it may not be necessary to check the entries for all data fields for correctness. Typically, all of the data entered in mandatory data entry fields would be checked and some of the data entered in optional data entry fields might be checked. An example of an optional entry field that would not be checked would be a memo field in which comments pertinent to a specific order, for example, might optionally be entered.

BRIEF DESCRIPTION OF THE DRAWINGS

The foregoing and other objects, aspects and advantages of the invention will be better understood from the following detailed description of the preferred embodiment of the invention with reference to the drawings, in which:

FIG. 1 is an illustration of a data entry screen showing a mandatory data entry field.

DETAILED DESCRIPTION OF THE INVENTION

Figure 2:
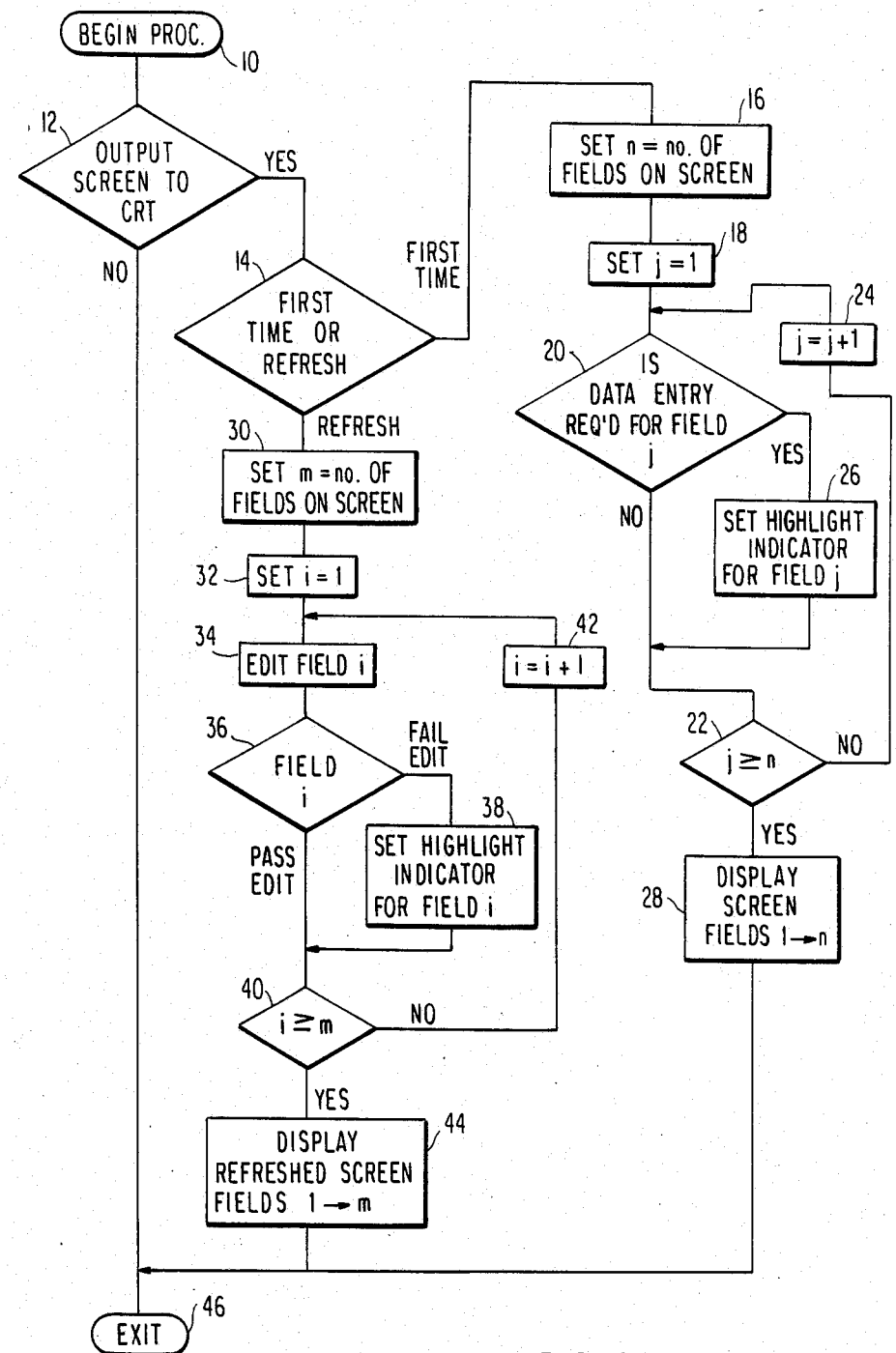
FIG. 2 is a flow diagram illustrating the operation of the invention.

Referring now to the drawings, and more particularly to FIG. 1, there is shown an example of a data entry screen with a mandatory data entry field highlighted. The highlighting is shown by a rectangle enclosing the data entry field and stippling within the rectangle, but it will be understood that the highlighting may be by increased intensity or any other display technique. The optional data entry fields are shown without highlighting. Thus, for the illustrated example, a shipment tracing screen is displayed in which the user must enter a Pro number in the mandatory data entry field. Optionally, if the user wants the Pro number history and copy bill to be printed, the user enters an "X" in the columns HISTORY and COPY. There are additional data entry fields in each of the three columns of this particular data entry screen which allows the user to enter more than one Pro number for purposes of the shipment tracing application for which this data entry screen was designed. This is, of course, a simple illustration, and those skilled in the art will recognize that the principles of the invention are readily applied to other and more complex data entry screens. Many such screens will have a plurality of mandatory data entry fields such as name, company, address and so forth. Each of these mandatory data entry fields are highlighted to indicate to the user the requirement for data entry. In the preferred embodiment of the invention, all mandatory data entry fields are highlighted when the screen is first presented to the user. Alternatively, the mandatory data entry fields could be highlighted as the cursor is indexed to each such field.

Data entered in any data entry field, no matter whether mandatory or optional, that is subject to a data checking program and found to be in error will be displayed in highlight indicating to the user that the data must be corrected before data from the screen can be completely processed. In the example shown in FIG. 1, only the Pro number entry would be subject to a data checking program. For example, if all Pro numbers are ten digits long, no alpha characters are used and the first digit does not exceed two, the data checking program would check to see that ten numeric characters were entered and that the first digit is less than or equal to two. If the user were to violate any of these rules as, for example, by entering an alpha character, the entered data would be displayed in highlight rather than processed and displayed without highlighting. This indicates to the user that an error has been made in the data entry which must be corrected before the information entered in the data entry screen will be accepted and processed.

When the ENTER key is pressed, all entries are processed and if no data or erroneous data is entered, it fails the edit function. This might also be coupled with an error message displayed at the bottom of the screen, but such display of an error message does not form part of the present invention. The point to be appreciated is that the display of erroneous data in highlight is consistent with the original display showing mandatory data entry fields.

FIG. 2 shows the flow diagram of the invention. Initially, at the beginning of the process indicated by the BEGIN PROC block 10, decision block 12 tests whether a formatted display containing data entry fields is to be displayed on the screen, for example a cathode ray tube (CRT). If so, decision block 14 tests whether it is the first time the screen is to be displayed or if the screen is to be refreshed. As is well known in the programming art, the process of setting the data fields is generally already part of a computer program resident in a system when the user accesses the program via the system. A data entry screen is presented to the user upon the pressing of a COMMAND key. However, because the highlighting of data entry fields in which data entry by the user is mandatory is an important part of the invention, this routine will be described.

If the data entry fields are to be set, the program sets the number (n) of fields on the screen as shown in block 16, and the first data entry field is established by setting j=1 as shown in block 18. Decision block 20 determines whether data entry is mandatory for the specified field. If it is not, then decision block 22 tests whether j has reached the value n. If not, the value for j is incremented by 1 as shown in block 24 and the process repeats for j=2 and so forth. If decision block 20 indicates that data entry is mandatory for the particular field j, the highlight indicator for the field j is set as shown in block 26. The program continues until all of the data entry fields have either received a highlight indicator or not. The subroutine then exits to block 28, and the screen displays all of the fields on the screen with the mandatory fields being distinguished from the fields where data entry is not mandatory by some from of highlighting.

During the next stage of the process, the user is presented with the data entry screen and enters data in a conventional fashion into the fields shown on the screen. The fields shown on the screen may be the same number that was set in the previous routine or may be a different number m which is generally equal to n but may be larger if another field is displayed on the screen by means of another program built into the system.

After the user has entered data into the data entry fields, the process begins again, generally with the user pressing the ENTER key which causes the program to act on the data. The program then proceeds through decision blocks 12 and 14 which determines that the screen display is being refreshed. The program sets the number of fields on the screen in block 30 and selects the first field by setting i=1 as shown in block 32. Then in block 34, the program then edits each of the fields by means of a data check program which is called to check the data which was previously entered by the user. As previously described, this program may be one that checks zip codes against cities and states or stock numbers against other inventory identifiers. Such programs are known and do not form a part of this invention.

Decision block 36 indicates for each field whether it has failed or passed the edit process. Obviously, editing of any individual field may depend in total or in part on the user's entry in one or more other fields. If the particular field i fails the process, the highlight indicator is set for that field as shown in block 38. The program proceeds for each field i. Specifically, in decision block 40, i is tested to see if it is greater or equal to m, and if it is not, i is incremented by 1 in block 42 and the process returns to block 34. On the other hand, when i is tested and found to be greater or equal to m in decision block 40, the data entry process is complete for the displayed screen, and in block 44, the refreshed screen is displayed and the process exits at block 46. The user then has the opportunity to enter new data in the highlighted fields either to correct the erroneous data or to enter data in a mandatory field.

Although the preferred embodiment of my invention indicates that the edit program acts upon all of the display fields on the screen without further interaction with the user, it should be understood that each data entry block could be separately edited by the edit program, displayed to the user who would then re-enter data as necessary and press the ENTER or RETURN or TAB key to cause the program to act upon the same data entry field until the data is correctly entered. This latter procedure would be used, for example, on a personal computer where the programs generally enter data separately for each data entry field.

While the invention has been described by way of a simple preferred embodiment, those skilled in the art will appreciate that the principles of the invention may be used in more complex applications where mandatory and correct data must be entered into a data processing system. In addition, the invention may be used with a wide variety of hardware including micro, mini and main frame computers and a variety of displays including CRTs, gas panels, LCDs and both monochrome and color displays.

What is claimed is:

1. In an interactive data entry system wherein a user is presented with a data entry screen which includes a display of manadatory and optional data entry fields, the method for identifying to the user only those fields in which data must be entered, said method comprising the steps of initially displaying the formatted data entry screen to the user with only said mandatory data entry fields highlighted, checking the correctness of data entered by the user in both said mandatory and optional data entry fields, and if an error is detected in the data entered in either said mandatory or optional data entry fields, processing and redisplaying the incorrectly entered data with highlighting.

2. The method according to claim 1 wherein the step of checking of the correctness of data is accomplished after the user has selectively entered or omitted data in all of the data entry fields.

3. The method according to claim 1 wherein the step of checking of the correctness of data is accomplished for a particular field after the user has enter data in said particular field.

4. In an interactive data entry system wherein a user is presented with a data entry screen displaying both mandatory and optional data entry fields, the method for identifying to the user those fields where data may be entered and those fields in which data must be entered, said method comprising the steps of initially displaying the formatted data entry screen to the user with mandatory data entry fields highlighted and optional data entry fields without highlighting, as data is correctly entered into either a mandatory or optional data entry field, processing the correctly entered data and redisplaying the entered data without highlighting, checking the correctness of data entered by the user in at least the mandatory data entry fields, and if an error is detected in the data entered, processing and redisplaying the incorrectly entered data with highlighting.

5. The method according to claim 4 wherein the step of checking also includes checking the correctness of data entered by the user in some of the optional data entry fields.

* * * * *